May 12, 1925.  1,537,832

T. LAFITTE

KINEMATIC ACTUATING DEVICE FOR VALVE GEARS AND THE LIKE

Filed April 5, 1922

Inventor
Théodore Lafitte
by [signature]
Attorneys

Patented May 12, 1925.

1,537,832

UNITED STATES PATENT OFFICE.

THÉODORE LAFITTE, OF PARIS, FRANCE.

KINEMATIC ACTUATING DEVICE FOR VALVE GEARS AND THE LIKE.

Application filed April 5, 1922. Serial No. 549,948.

*To all whom it may concern:*

Be it known that I, THÉODORE LAFITTE, a citizen of the Republic of France, and residing at Paris, Seine Department, No. 15 Avenue Pasteur, in the Republic of France, have invented certain new and useful Kinematic Actuating Devices for Valve Gears and the like, of which the following is a specification.

My invention relates to a kinetic disposition for the actuating of the valve gear and the various elements such as magneto, pump, lighting dynamo, oil pump, and air fan, in explosion or internal combustion engines of the two-cycle or four-cycle type. This mechanism replaces gearing or chain driving devices of all kinds and affords a silent and absolutely continuous operation of the valve gear and the accompanying elements.

It is essentially constituted by the disposition in triangle of at least three parallel shafts each provided with a crank of the same radius, connected together by a disk or connecting plate. The said plate by reason of two wrist pins suitably disposed thereon is enabled to rotate at half-speed a disk having therein two perpendicular grooves and mounted on the cam shaft, this being employed in the case of a four-cycle engine.

The following description, together with the accompanying drawings which are given by way of example sets forth an embodiment of the invention as applicable to a motor vehicle engine of the known four-cycle type with single cam shaft.

Figure 1:
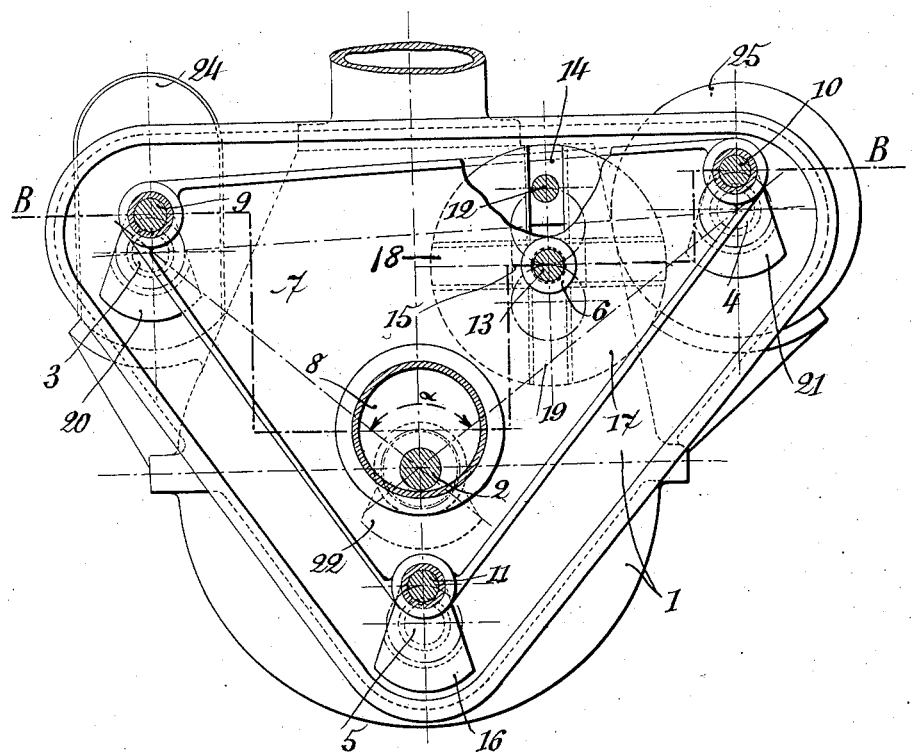
Fig. 1 is a front view, with the cover of the casing of the device removed and various parts in section on the line A—A Fig. 2.
Figure 2:
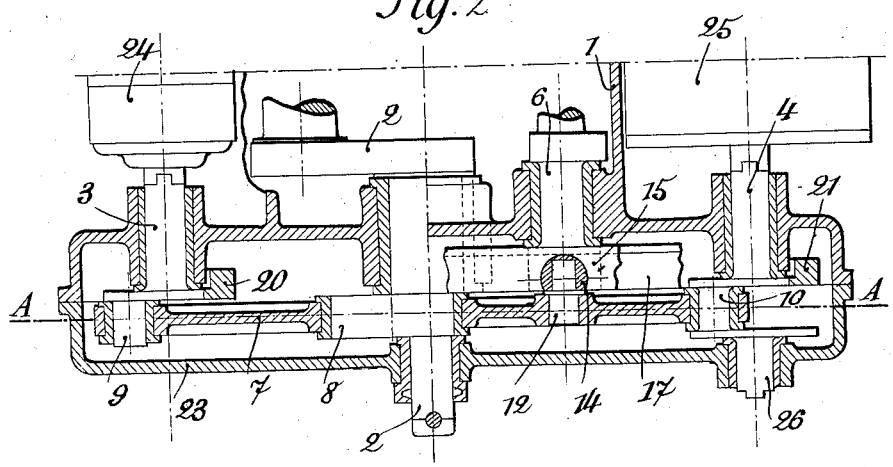
Fig. 2 is a section in various steps on the line B—B Fig. 1, the cranks being displaced by a quarter of a revolution with reference to the position Fig. 1.

Within the casing 1 are caused to rotate the driving shaft or crankshaft 2, the shafts 3, 4, 5 and the cam shaft 6, in parallel bored-out recesses. The said shafts carry respectively an eccentric 8 and the cranks 9, 10 and 11; the said cranks have the same length and are parallel to each other, and their crank-pins are connected together by a connecting plate 7 having bores with annular raised portions and whereof the distance between centers are exactly equal to those of the bores in the casing 1, in order to carry the said shafts. The connecting plate 7 which is preferably of ribbed aluminum and of very light construction is thus caused to maintain the radii of the eccentric and of the cranks 8, 9, 10 and 11 in all cases in an exactly parallel position. To the connecting plate 7 are secured two wrist pins 12 and 13 engaging by easy friction in the slides 14 and 15 which are slidable in the perpendicular grooves 18 and 19 formed in a disk 17 which is mounted on the cam shaft 6. The various cranks are provided with counterweights 16, 20, 21 and 22 adapted to equilibrate the crank-pins as well as the connecting disk 7. A cover 23 closes the casing of the mechanism. At the exterior and upon suitable supports is disposed the magneto 24 actuated by 3 and also the dynamo 25 actuated by 4. The shaft 5 may actuate an oil pump, a water pump, or like device. Like shafts may be provided for other devices such as air fan, speed counter, or similar parts.

The operation of the apparatus is as follows:

The rotation of the crankshaft 2 will effect the rotation of the eccentric 8, thereby moving the disk 7 which actuates the crank-pins 9, 10 and 11, and thus produces the rotation of the shafts 3, 4 and 5 at the same speed as the shaft 2 which is that of the engine shaft. This speed will be suitable for the magneto, the lighting dynamo and the pump, in a given case.

For an engine of the two-cycle type the valve gear drive which is carried out at the same speed as the engine will be effected as above indicated with a crank such as 3, 4 or 5 pivoted to the connecting disk 7.

For an engine of the four-cycle type, it is necessary that the valve gear shaft should rotate at half-speed. This speed reduction is obtained in the following manner. The spacing of the pins 12 and 13 is exactly equal to the diameter of the circumference described by any one of the cranks 9, 10, etc., or any point on the connecting disk 7. The circumference described by the axes of the pins 12 and 13, in the circular motion of translation of the connecting plate 7 are therefore tangent to each other at a given point.

Through this point passes the axis of the cam shaft 6 which carries the disk 17, in the grooves 18 and 19 whereof are slidable the slides 14 and 15. When the crankshafts and crank-pins 2, 3, 4 and 5 have effected half-a-revolution, the pin 12 and the slide thereof 14, for example, will assume the position of 13 and 15 respectively and the groove 19 which was vertical will now become horizontal; the disk 17 will in this manner have made a quarter of a revolution. The same effect will take place at each half-revolution of the cranks, and this will consequently afford the ratio of one to two which is required for the cam shaft 6, and the four-cycle engine can thus be operated.

A like control device by the use of the connecting disk 7 could also be employed concurrently with the known reduction gears for the cam shaft. In this event the invention will enable the reduction of the diameter of the said gears to a minimum inasmuch as their axes can be brought together as closely as possible.

Claims:

1. In a motor, a driving mechanism comprising a driving shaft a plurality of parallel shafts adapted to actuate the machines pertaining to the motor such as the magneto, pump, lighting generator, air fan and the like, cranks of equal length disposed upon all of these shafts and in parallel position, a plate having all of the said cranks pivoted thereto, means for rotating the said plate in a circular path in concordance with the rotation of the motor shaft, a cam shaft parallel with the driving shaft and with said parallel shafts adapted to drive parts of the motor, a disk having two crossed grooves disposed on the end of the cam shaft adjacent the said plate, two slides cooperating with the said grooves, two wrist pins disposed upon the said plate, the said wrist pins being respectively connected with the said slides and spaced apart by a distance equal to the diameter of the circle described by the said cranks.

2. In a motor, a driving mechanism comprising a driving shaft, several parallel shafts adapted to drive parts of the motor, such as magneto, pump, lighting dynamo, fan, and the like, cranks of the same length mounted on all said parallel shafts, one being parallel to the other, a plate to which all cranks are articulated, means for imparting motion to the plate in a circular path in conformity with the revolving motion of the driving shaft, a cam shaft parallel with the driving shaft and with the said parallel shafts which are adapted to operate the parts of the motor, a disc provided with two crosswise grooves upon the end of the cam shaft which is nearer to said plate, two slides sliding in these grooves, two wrist pins pivotally engaged with said slides and arranged upon said plate, said wrist pins being adapted to move along two circles which are tangent the one to the other and symmetrically opposed with reference to the axis of revolution of said driven plate.

3. In an engine, an actuating mechanism comprising a plurality of parallel shafts adapted to drive the elements of the said engine such as magneto, pump, lighting dynamo, air fan and the like, cranks having a common length disposed upon all of the said shafts and in parallel position, a plate having all of the said cranks pivoted thereto, means for giving to the said plate a circular motion of translation in concordance with the rotation of the main power shaft, a cam shaft parallel to the preceding shafts, a disk having therein two grooves in the form of a cross and mounted on the end of the cam shaft adjacent the said plate, two slides adapted to slide in the said grooves, two wrist pins disposed upon the said plate, the said pins being respectively connected with the said slides and spaced apart by a distance equal to the diameter of the circle described by the said cranks.

In testimony that I claim the foregoing as my invention I have signed my name.

THÉODORE LAFITTE.